United States Patent
Chang et al.

(10) Patent No.: US 9,053,252 B2
(45) Date of Patent: Jun. 9, 2015

(54) STORAGE EXPANSION APPARATUS AND SERVER

(71) Applicant: Huawei Technologies Co., Ltd., Shenzhen (CN)

(72) Inventors: Sheng Chang, Hangzhou (CN); Gongyi Wang, Hangzhou (CN); Tao Li, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/512,790

(22) Filed: Oct. 13, 2014

(65) Prior Publication Data

US 2015/0032932 A1    Jan. 29, 2015

Related U.S. Application Data

(63) Continuation of application No. PCT/CN2012/078032, filed on Jul. 2, 2012.

(51) Int. Cl.
*G06F 13/36* (2006.01)
*G06F 13/00* (2006.01)
*G06F 13/42* (2006.01)
(Continued)

(52) U.S. Cl.
CPC .......... *G06F 13/4282* (2013.01); *G06F 13/385* (2013.01); *G06F 13/4022* (2013.01); *G06F 13/4027* (2013.01); *G06F 13/00* (2013.01); *G06F 13/1689* (2013.01); *G06F 13/28* (2013.01)

(58) Field of Classification Search
CPC ............................. G06F 13/28; G06F 3/0635
USPC .............................. 710/36–38, 105, 306–317
See application file for complete search history.

(56) References Cited

U.S. PATENT DOCUMENTS 7,913,027 B2 *  3/2011  Kloeppner et al. ........... 710/316
7,917,682 B2 *  3/2011  Bakthavathsalam .......... 710/315
(Continued)

FOREIGN PATENT DOCUMENTS

CN       1731369 A    2/2006
CN     102200952 A    9/2011

OTHER PUBLICATIONS

Foreign Communication From a Counterpart Application, PCT Application No. PCT/CN2012/078032, English Translation of International Search Report dated Apr. 4, 2013, 2 pages.
(Continued)

*Primary Examiner* — Raymond Phan
(74) *Attorney, Agent, or Firm* — Conley Rose, P.C.; Grant Rodolph

(57) ABSTRACT

A storage expansion apparatus and a server, where the storage expansion apparatus includes a quick path interconnect (QPI) interface module, which communicates with a central processing unit (CPU) through a QPI bus; a peripheral component interconnect express (PCIe) interface module, which communicates with the CPU through a PCIe bus; an interface selecting module, connected to the QPI interface module and the PCIe interface module separately; a home agent (HA) module, connected to the interface selecting module; and a memory controller engine (MCEng) module, connected to the HA module and the interface selecting module separately. The storage expansion apparatus may serve as a CPU memory capacity expansion device, and may also serve as storage expansion hardware of storage input and output (TO).

10 Claims, 13 Drawing Sheets

(51) Int. Cl.
*G06F 13/38* (2006.01)
*G06F 13/40* (2006.01)
*G06F 13/16* (2006.01)
*G06F 13/28* (2006.01)

(56) References Cited

U.S. PATENT DOCUMENTS

| | | | |
|---|---|---|---|
| 8,255,608 B2* | 8/2012 | Kuan et al. | 710/316 |
| 8,417,864 B2* | 4/2013 | Sun et al. | 710/301 |
| 8,688,887 B2 | 4/2014 | Aldereguia et al. | 710/313 |
| 8,751,714 B2* | 6/2014 | Safranek et al. | 710/105 |
| 8,775,713 B2* | 7/2014 | Chandra et al. | 710/316 |
| 8,782,321 B2* | 7/2014 | Harriman et al. | 710/316 |
| 2005/0071534 A1 | 3/2005 | Kwatra | |
| 2010/0161924 A1 | 6/2010 | Sasage | |
| 2011/0029696 A1* | 2/2011 | Uehara | 710/9 |
| 2011/0072185 A1* | 3/2011 | Pinto et al. | 710/315 |
| 2011/0113115 A1 | 5/2011 | Chang et al. | |
| 2013/0268713 A1* | 10/2013 | Choi | 710/313 |
| 2014/0006677 A1* | 1/2014 | Iyer et al. | 710/316 |
| 2014/0372637 A1* | 12/2014 | Voorhees et al. | 710/52 |

OTHER PUBLICATIONS

Foreign Communication From a Counterpart Application, PCT Application No. PCT/CN2012/078032, Written Opinion dated Apr. 4, 2013, 3 pages.

* cited by examiner

STORAGE EXPANSION APPARATUS AND SERVER

CROSS-REFERENCE TO RELATED APPLICATIONS

This application is a continuation of International Application No. PCT/CN2012/078032, filed on Jul. 2, 2012, which is hereby incorporated by reference in its entirety.

TECHNICAL FIELD

Embodiments of the present invention relate to communications technologies, and in particular, to a storage expansion apparatus and a server.

BACKGROUND

In a server, computing resources and storage resources are key factors of entire system performance. With rapid development of microelectronic technologies, performance of a processor is being multiplied. Although processor technologies are progressing, a memory capacity is still limited. Due to the memory capacity limitation, a utilization rate of the server cannot increase with improvement of processor performance. Reasons are as follows.

First, currently the processor performance is improved primarily using the number of cores and a cache rather than a clock speed; secondly, the number of cores, the cache capacity, and the number of threads increase with a decrease of an operating frequency of a central processing unit (CPU), and a deficient increase of the memory capacity leads to imbalance; and thirdly, 64-bit applications and operating systems require a larger memory.

Seen from a perspective of a utilization rate of an entire server, the utilization rate of the server is no longer restricted by performance of the CPU, but primarily restricted by the memory capacity and a read/write rate of memory data.

Currently, the read/write rate of the memory data is restricted by manufacturing industrial technologies, and a read/write speed of a storage can hardly be increased. Therefore, only how to expand the memory capacity can be considered. A technical issue that currently needs to be solved is how to expand the memory capacity and develop a memory expansion device applicable to a plurality of interfaces and a plurality of configurations and switchable to storage expansion hardware so as to enhance server performance.

SUMMARY

In view of this, embodiments of the present invention provide a storage expansion apparatus and a server, which are capable of serving as a CPU memory capacity expansion device, and are capable of switching to storage expansion hardware of a storage input and output (TO) device.

In one aspect, a storage expansion apparatus provided in an embodiment of the present invention includes a quick path interconnect (QPI) interface module, which communicates with a CPU through a QPI bus; a peripheral component interconnect express (PCIe) interface module, which communicates with the CPU through a PCIe bus; an interface selecting module, connected to the QPI interface module and the PCIe interface module separately; a home agent (HA) module, connected to the interface selecting module; and a memory controller engine (MCEng) module, connected to the HA module and the interface selecting module separately, where when the storage expansion apparatus serves as a storage IO interface device, the PCIe interface module is configured to complete receiving of PCIe data sent through the PCIe bus, process a PCIe protocol storage transaction in the PCIe data, and send a processed PCIe protocol storage transaction to the MCEng module through the interface selecting module, and the MCEng module implements a read/write drive function and provides an interface for connecting to a storage IO device; or when the storage expansion apparatus serves as a memory expansion device, the QPI interface module is configured to complete receiving of QPI data sent through the QPI bus, obtain a QPI protocol transaction in the QPI data, send the QPI protocol transaction to the interface selecting module, and then output the QPI protocol transaction in the QPI data to the HA module through the interface selecting module; the HA module processes the QPI protocol transaction in the QPI data, and sends a processed QPI protocol transaction to the MCEng module; and the MCEng module implements a read/write drive function and provides an interface for connecting to an expanded memory; or when the storage expansion apparatus serves as a memory expansion device, the PCIe interface module is configured to complete receiving of PCIe data sent through the PCIe bus, obtain a QPI protocol transaction in the PCIe data, send the QPI protocol transaction to the interface selecting module, and then output the QPI protocol transaction in the PCIe data to the HA module through the interface selecting module; the HA module processes the QPI protocol transaction in the PCIe data, and sends a processed QPI protocol transaction in the PCIe data to the MCEng module; and the MCEng module implements a read/write drive function and provides an interface for connecting to an expanded memory.

In a possible implementation manner, the storage expansion apparatus further includes a system management bus (SMbus) selecting module, connected to the interface selecting module, and configured to send a selection instruction to the interface selecting module, so that, according to the selection instruction, the interface selecting module chooses to receive the QPI protocol transaction that is obtained by the QPI interface module and sent by the QPI interface module; or chooses to receive the QPI protocol transaction that is obtained by the PCIe interface module and sent by the PCIe interface module; or chooses to receive the processed PCIe protocol storage transaction sent by the PCIe interface module.

In another possible implementation manner, the storage expansion apparatus further includes a selection instruction switching module, connected to the CPU and connected to the QPI interface module and the PCIe interface module separately, and configured to enable data output by the CPU to be transmitted to the QPI interface module through the QPI bus, and send a first memory expansion instruction to the SMbus selecting module, where the SMbus selecting module sends the selection instruction to the interface selecting module according to the first memory expansion instruction; or configured to enable data output by the CPU to be transmitted to the PCIe interface module through the PCIe bus after interface adaptation, and send a second memory expansion instruction to the SMbus selecting module, where the SMbus selecting module sends the selection instruction to the interface selecting module according to the second memory expansion instruction; or configured to enable data output by the CPU to be transmitted to the PCIe interface module through the PCIe bus, and send a storage instruction to the SMbus selecting module, where the SMbus selecting module sends the selection instruction to the interface selecting module according to the storage instruction.

In another aspect, a server provided in an embodiment of the present invention includes a CPU and any one of the storage expansion apparatuses described in the present invention, where the CPU is connected to a QPI interface module in the storage expansion apparatus through a QPI bus, and the CPU is connected to a PCIe interface module in the storage expansion apparatus through a PCIe bus.

As can be seen from the foregoing technical solutions, the storage expansion apparatus and the server in the embodiments of the present invention communicate with a CPU through a QPI interface module and a PCIe interface module, and use an interface selecting module to choose to receive data output by the QPI interface module or the PCIe interface module; if the storage expansion apparatus serves as a storage IO device, data output by the interface selecting module may be output to an MCEng module directly; and if the storage expansion apparatus serves as a memory expansion device, the data output by the interface selecting module is output to the MCEng module after being processed by an HA module, and therefore, the storage expansion apparatus is capable of serving as a CPU memory capacity expansion device with a QPI interface and a PCIe interface, and is capable of switching to storage expansion hardware of a storage IO device, thereby enhancing server performance.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following clearly describes the technical solutions of the present invention with reference to the accompanying drawings in the embodiments of the present invention. The described embodiments are a part of the embodiments of the present invention. Based on each of the following embodiments of the present invention, persons of ordinary skill in the art can equivalently change part or all of the technical features without making creative efforts to obtain other embodiments that can solve technical issues of the present invention and achieve technical effects of the present invention. Such embodiments derived from the change do not depart from the scope disclosed in the present invention.

The embodiments of the present invention primarily provide a storage expansion apparatus applicable to a plurality of interfaces and a plurality of configurations, which is used to enhance a memory/storage capacity of a server conveniently and flexibly, thereby enhancing server performance.

Figure 1A:
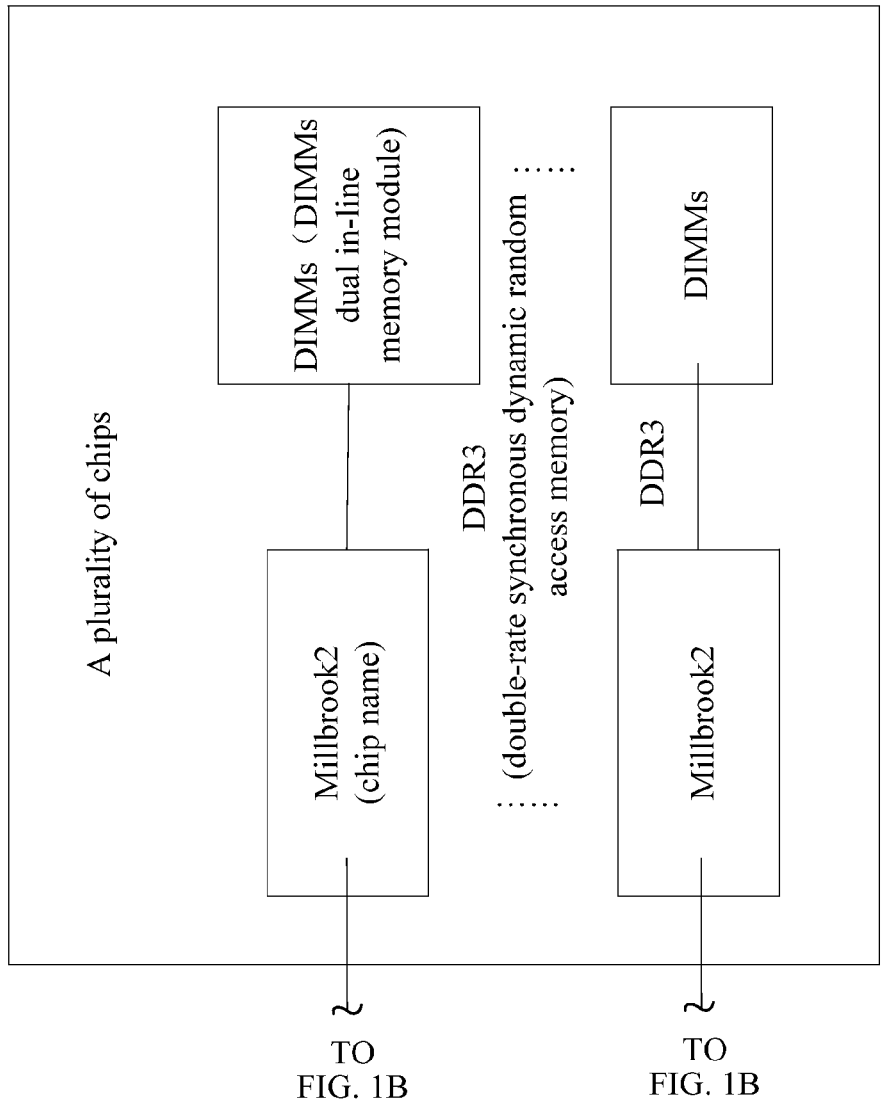
FIGS. 1A-1C are a schematic structural diagram of a storage expansion apparatus according to an embodiment of the present invention.
Figure 1B:
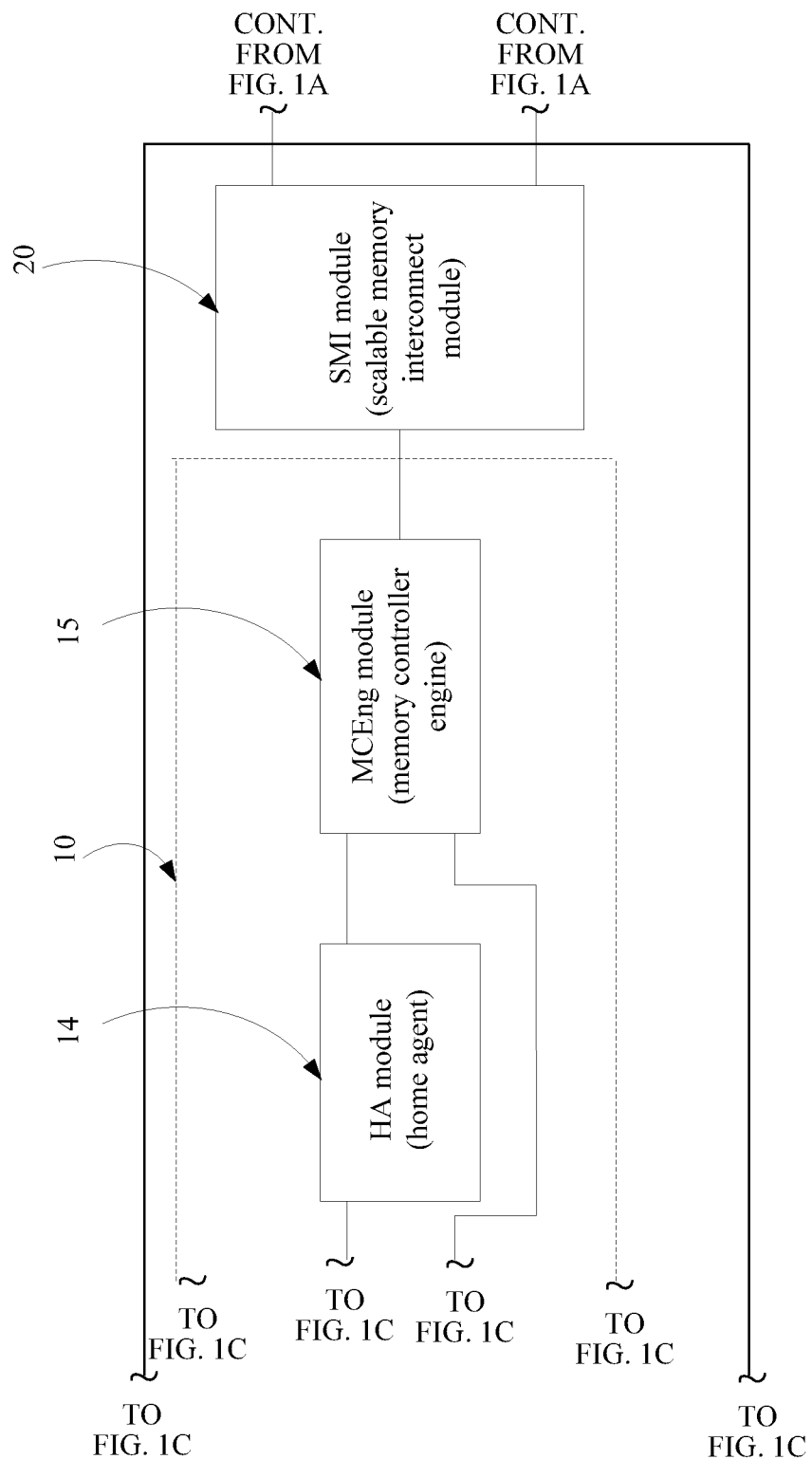
Figure 1C:
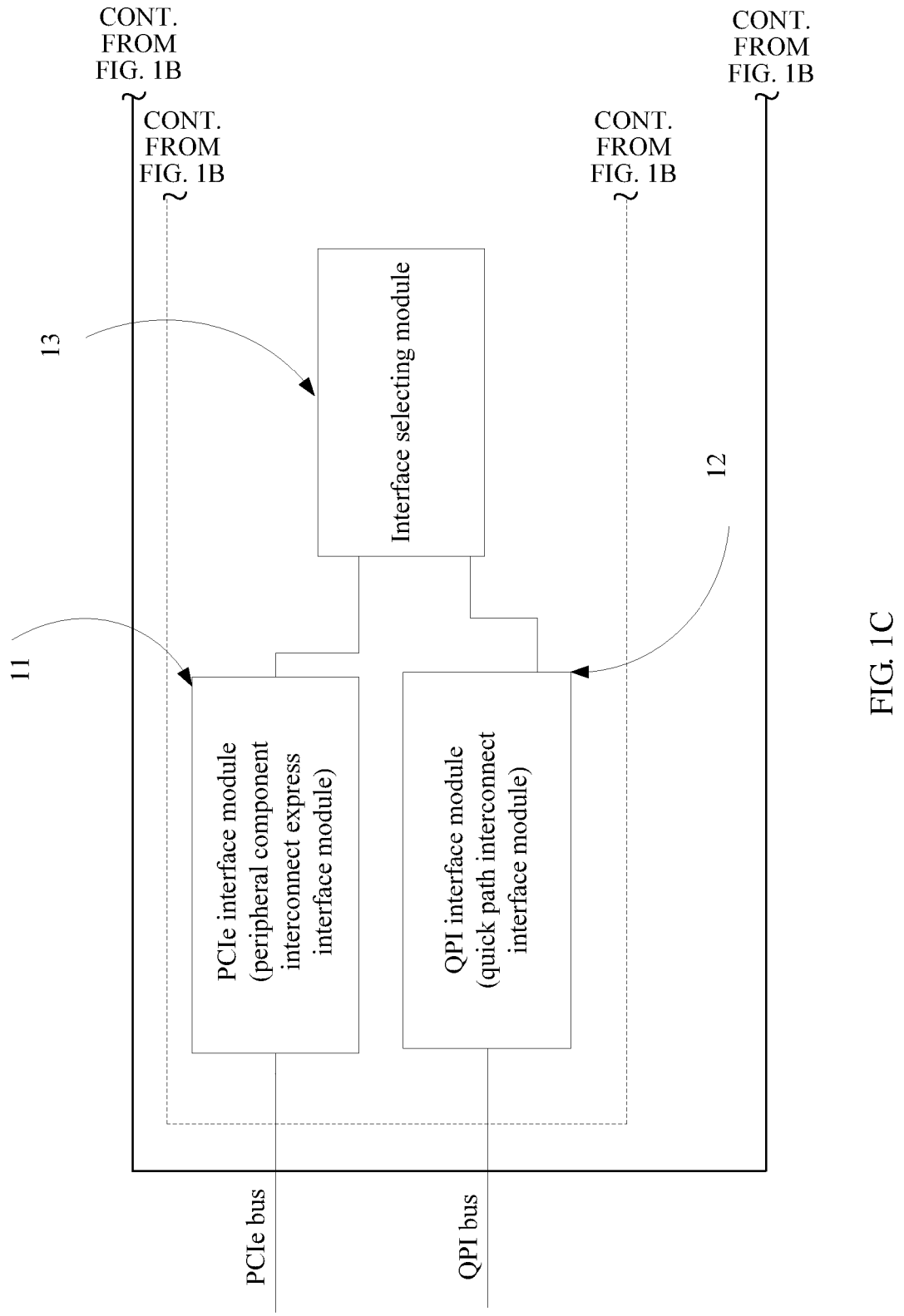
Figure 2A:
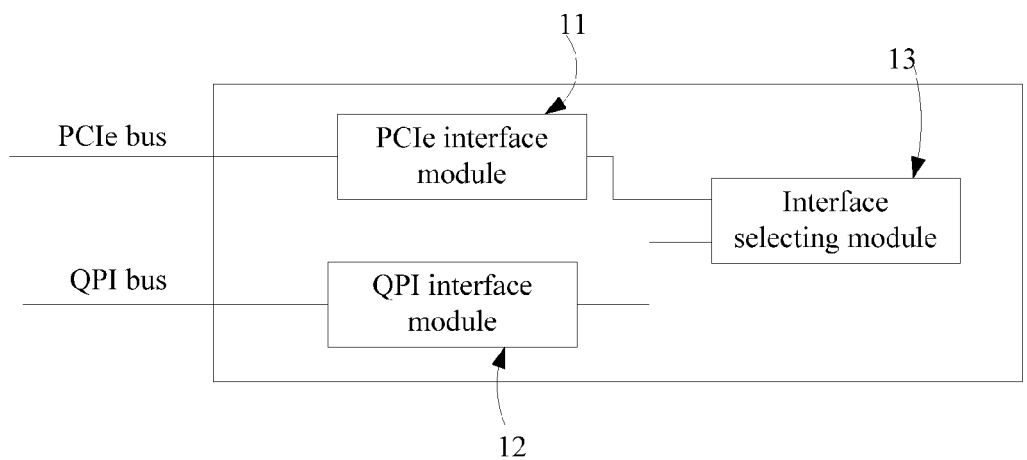
FIGS. 2A-2C are partial schematic structural diagrams of a storage expansion apparatus according to an embodiment of the present invention.
Figure 2B:
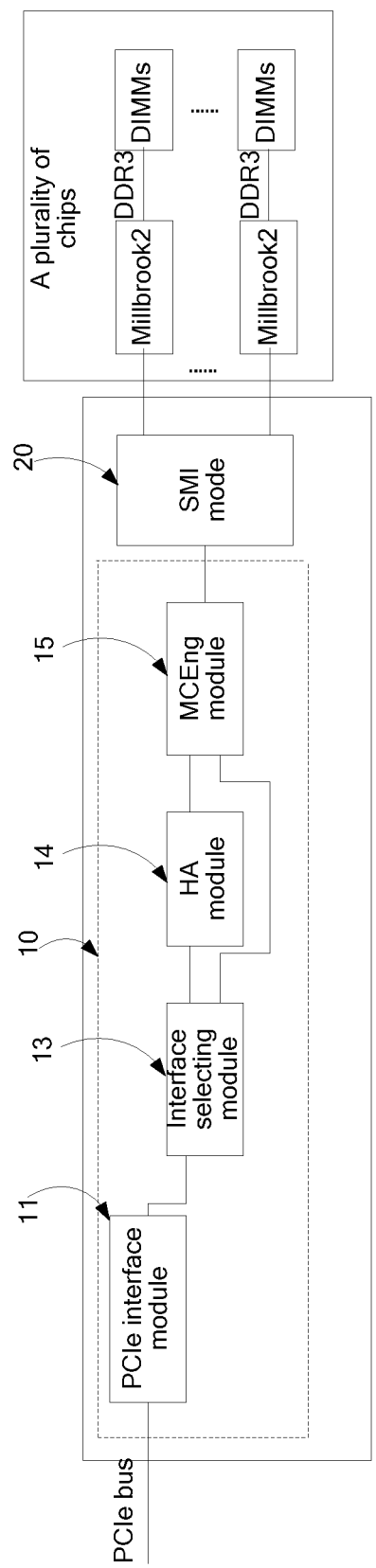
Figure 2C:
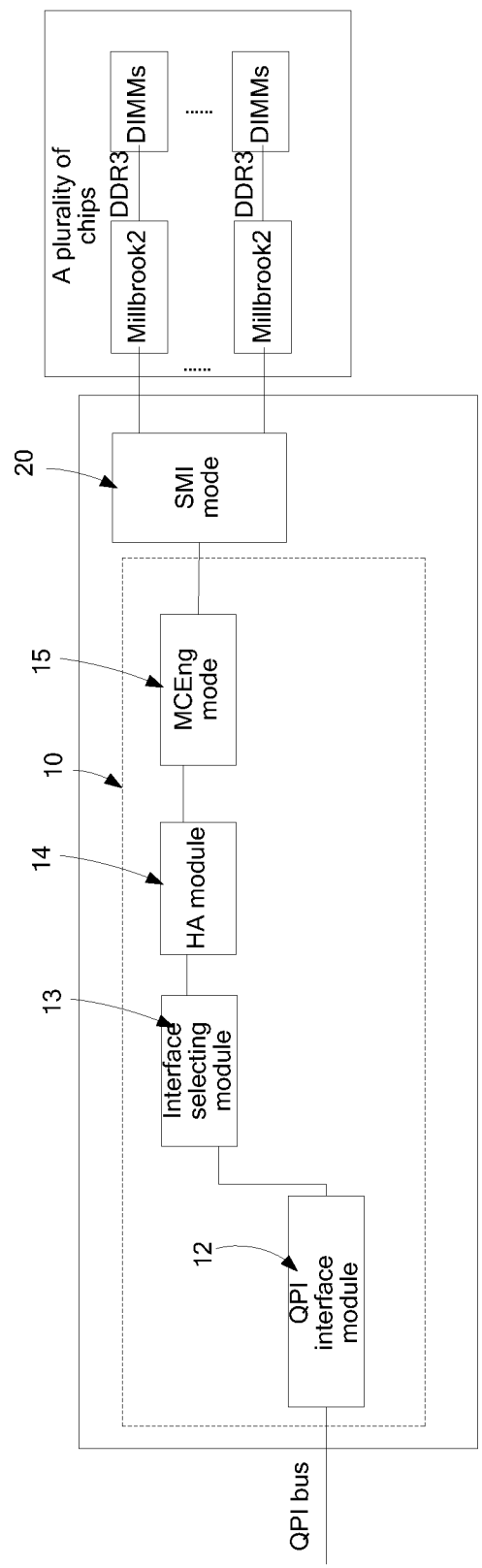

With reference to FIG. 1A to FIG. 2C, FIG. 1A and FIG. 1B and FIG. 1C show a schematic structural diagram of a storage expansion apparatus provided in an embodiment of the present invention, and FIG. 2A to FIG. 2C show partial schematic structural diagrams of a storage expansion apparatus provided in an embodiment of the present invention, where, for ease of viewing the storage expansion apparatus shown in FIG. 1A and FIG. 1B and FIG. 1C, FIG. 2A, FIG. 2B and FIG. 2C show partial structures of the storage expansion apparatus separately. As shown in the diagrams, FIG. 2A shows a part of a schematic structural diagram in FIG. 1A and FIG. 1B and FIG. 1C, FIG. 2B shows a schematic diagram about how a CPU in a storage expansion apparatus 10 is connected to a PCIe interface module 11 through a PCIe bus, and FIG. 2C shows a schematic diagram about how the CPU in the storage expansion apparatus 10 is connected to a QPI interface module 12 through a QPI bus.

The storage expansion apparatus 10 (a structure in a dashed box in FIG. 1A and FIG. 1B and FIG. 1C) in this embodiment includes a QPI interface module 12, which communicates with a CPU through a QPI bus, where the QPI interface module 12 may be connected to a QPI interface (not shown in FIG. 1A and FIG. 1B and FIG. 1C) of the CPU to implement communication with the CPU; a PCIe interface module 11, which communicates with the CPU through a PCIe bus, where the PCIe interface module 11 may be connected to the QPI interface of the CPU to implement communication with the CPU; an interface selecting module 13, connected to the QPI interface module 12 and the PCIe interface module 11 separately; an HA module 14, connected to the interface selecting module 13; and a MCEng module 15, connected to the HA module 14 and the interface selecting module 13 separately.

When the storage expansion apparatus 10 serves as a storage IO interface device, the PCIe interface module 11 is configured to complete receiving of PCIe data sent through the PCIe bus, process a PCIe protocol storage transaction in the PCIe data, and send a processed PCIe protocol storage transaction to the MCEng module 15 through the interface selecting module 13, where the MCEng module implements a read/write drive function and provides an interface for connecting to a storage IO device; when the storage expansion apparatus 10 serves as a memory expansion device, the QPI interface module 12 is configured to complete receiving of QPI data sent through the QPI bus, obtain a QPI protocol transaction in the QPI data, send the QPI protocol transaction to the interface selecting module 13, and then use the interface selecting module 13 to output the QPI protocol transaction obtained by the QPI interface module to the HA module 14; the HA module 14 processes the QPI protocol transaction obtained by the QPI interface module, and sends a processed QPI protocol transaction to the MCEng module 15; and the MCEng module implements a read/write drive function and provides an interface for connecting to an expanded memory; or when the storage expansion apparatus 10 serves as a memory expansion device, the PCIe interface module 11 is configured to complete receiving of PCIe data sent through the PCIe bus, obtain a QPI protocol transaction carried in the PCIe data, send the QPI protocol transaction to the interface selecting module 13, and then use the interface selecting module 13 to output the QPI protocol transaction obtained by the PCIe interface module 11 to the HA module 14; the HA module 14 processes the QPI protocol transaction obtained by the PCIe interface module, and sends a processed QPI protocol transaction in the PCIe data to the MCEng module 15; and the MCEng module implements a read/write drive function and provides an interface for connecting to an expanded memory.

It should be noted that in a practical application, the CPU also needs to read relevant data cached/stored in the storage expansion apparatus 10. In this case, data sent through each of the foregoing data links flows into the CPU along a reverse direction of an original data link. For example, when the storage expansion apparatus serves as a storage IO interface device, if the CPU needs to read data stored in the storage expansion apparatus, the MCEng module 15 sends the corresponding data to the interface selecting module 13 according to a read instruction of the CPU, the interface selecting module 13 sends the corresponding data to the PCIe interface module 11, and the PCIe interface module 11 transmits the corresponding data to the CPU through the PCIe bus after adaptation.

It should be noted that in a practical application, when the storage expansion apparatus 10 serves as a memory expansion device, the PCIe interface module 11 cannot be directly connected to the QPI interface of the CPU, and the connection is enabled using a module for converting between a PCIe protocol and a QPI protocol to process content related to the QPI protocol. In this case, the PCIe interface module 11 being connected to the QPI interface of the CPU through the PCIe bus is actually the PCIe interface module 11 being connected to the QPI interface of the CPU through the PCIe bus after interface adaptation.

Correspondingly, the PCIe interface module 11 is configured to complete receiving and sending of PCIe data sent through the PCIe bus, and the QPI interface module 12 is also configured to complete receiving and sending of QPI data sent through the QPI bus. Functions of each module shown in FIG. 1A and FIG. 1B and FIG. 1C include functions that can be implemented by each existing module, and the functions of each module described in this embodiment are merely exemplary.

In a practical application, the MCEng module provides an interface for connecting to an expanded memory or IO device, which may be connecting to at least one chip through a data interface module, where the data interface module may be a scalable memory interconnect (SMI) module 20 shown in FIG. 1B or another existing data interface module. The SMI module shown in FIG. 1A and FIG. 1B and FIG. 1C may be a bus, and is configured to enhance drive of a double-rate synchronous dynamic random access memory (i.e. Double Data Rate RAM 3, DDR3). In other embodiments, the data interface module may be set according to actual requirements.

It should be noted that the MCEng module 15 primarily performs control on a memory, for example, initializes a memory device, sends various commands to the memory according to a state of the memory to control a running state of the memory, and implements access to the memory for the chip.

As can be seen from the foregoing embodiment, the storage expansion apparatus in this embodiment communicates with a CPU through a QPI interface module and a PCIe interface module, and uses an interface selecting module to choose to receive data output by the QPI interface module or the PCIe interface module; if the storage expansion apparatus serves as a storage IO device, the data output by the interface selecting module may be output to an MCEng module directly; and if the storage expansion apparatus serves as a memory expansion device, the data output by the interface selecting module is output to the MCEng module after being processed by an HA module, and therefore, the storage expansion apparatus is capable of serving as a CPU memory capacity expansion device with a QPI interface and a PCIe interface, that is, a memory expansion device with a plurality of interfaces, and is also capable of switching to storage expansion hardware of storage IO, thereby enhancing server performance.

Figure 3:
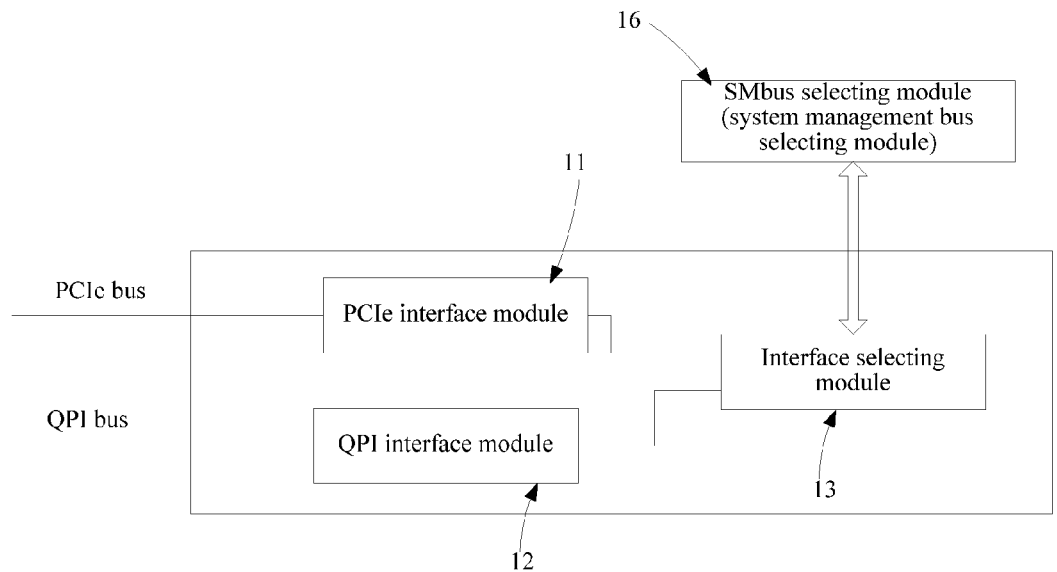
FIG. 3 is a partial schematic structural diagram of a storage expansion apparatus according to another embodiment of the present invention.

As shown in FIG. 3, FIG. 3 shows a partial schematic structural diagram of a storage expansion apparatus provided in another embodiment of the present invention. The storage expansion apparatus shown in FIG. 3 differs from the storage expansion apparatus 10 shown in FIG. 1A and FIG. 1B and FIG. 1C in that the storage expansion apparatus in this embodiment further includes a SMbus selecting module 16, where the SMbus selecting module 16 is connected to the interface selecting module 13, and is configured to send a selection instruction to the interface selecting module 13, so that, according to the selection instruction, the interface selecting module 13 chooses to receive a QPI protocol transaction that is obtained by the QPI interface module and sent by the QPI interface module 12; or chooses to receive a QPI protocol transaction that is obtained by the PCIe interface module and sent by the PCIe interface module 11; or chooses to receive a PCIe protocol storage transaction sent by the PCIe interface module 11. It is noteworthy that FIG. 3 does not show the HA module or the MCEng module in the storage expansion apparatus. Structures and connection relationships of the HA module and the MCEng module are basically consistent with those shown in FIG. 1A and FIG. 1B and FIG. 1C.

That is, when the storage expansion apparatus shown in FIG. 3 serves as a storage IO interface device, the SMbus selecting module 16 sends a selection instruction to the interface selecting module 13, so that, according to the selection instruction, the interface selecting module 13 chooses to receive a processed PCIe protocol storage transaction sent by the PCIe interface module 11.

When the storage expansion apparatus shown in FIG. 3 serves as a memory expansion device, if the QPI interface of the CPU is connected to the PCIe interface module 11 through the PCIe bus at this time, the SMbus selecting module 16 sends another selection instruction to the interface selecting module 13, so that, according to the another selection instruction, the interface selecting module 13 chooses to receive a QPI protocol transaction that is obtained by the PCIe interface module 11 and sent by the PCIe interface module 11; and when the storage expansion apparatus shown in FIG. 3 serves as a memory expansion device, if the QPI interface of the CPU is connected to the QPI interface module 12 through the QPI bus at this time, the SMbus selecting module 16 sends still another selection instruction to the interface selecting module 13, so that, according to the still another selection instruction, the interface selecting module 13 chooses to receive a QPI protocol transaction sent by the QPI interface module 12.

As can be seen from the foregoing embodiment, the storage expansion apparatus in this embodiment, through an SMbus selecting module, enables an interface selecting module to choose to receive data of a QPI interface module 12 or a PCIe interface module, so that the storage expansion apparatus is capable of serving as a CPU memory capacity expansion device or serving as storage expansion hardware of storage IO.

Figure 4:
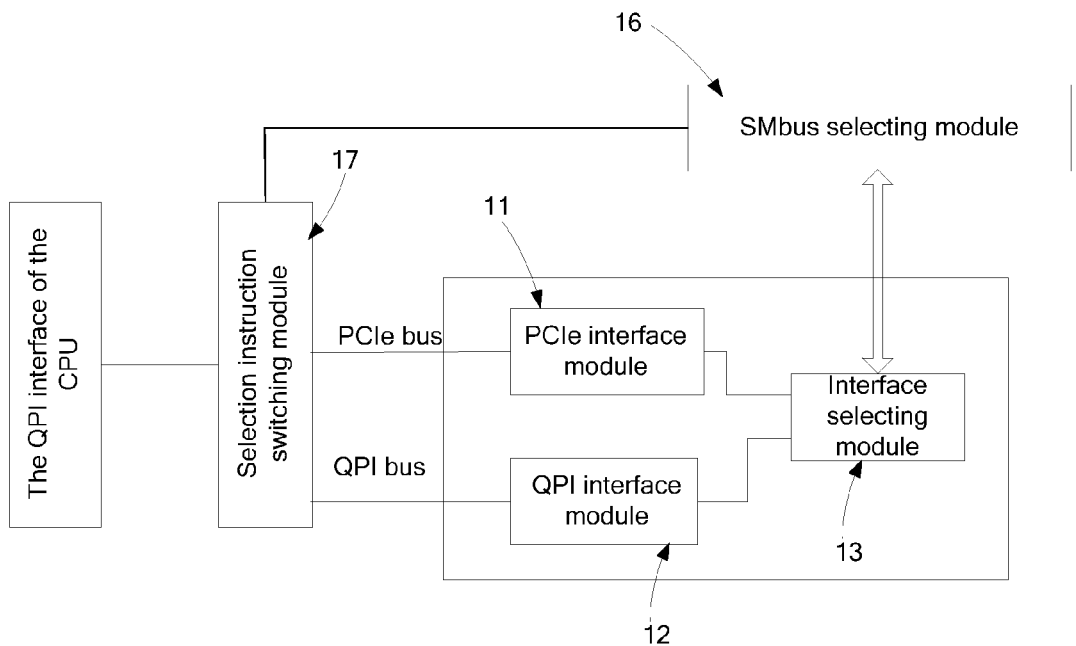
FIG. 4 is a partial schematic structural diagram of a storage expansion apparatus according to another embodiment of the present invention.

As shown in FIG. 4, FIG. 4 shows a partial schematic structural diagram of a storage expansion apparatus provided in another embodiment of the present invention. The storage expansion apparatus shown in FIG. 4 differs from the storage expansion apparatus shown in FIG. 3 in that the storage expansion apparatus in this embodiment further includes a selection instruction switching module 17.

The selection instruction switching module 17 is connected to the CPU and connected to the QPI interface module and the PCIe interface module separately, and is configured to enable data output by the CPU to be transmitted to the QPI interface module through the QPI bus, and send a first memory expansion instruction to the SMbus selecting module, where the SMbus selecting module sends a selection instruction to the interface selecting module according to the first memory expansion instruction; or configured to enable data output by the CPU to be transmitted to the PCIe interface module through the PCIe bus after interface adaptation, and send a second memory expansion instruction to the SMbus selecting module, where the SMbus selecting module sends a selection instruction to the interface selecting module according to the second memory expansion instruction; or configured to enable data output by the CPU to be transmitted to the PCIe interface module through the PCIe bus, and send a storage instruction to the SMbus selecting module, where the SMbus selecting module sends a selection instruction to the interface selecting module according to the storage instruction.

Figure 5A:
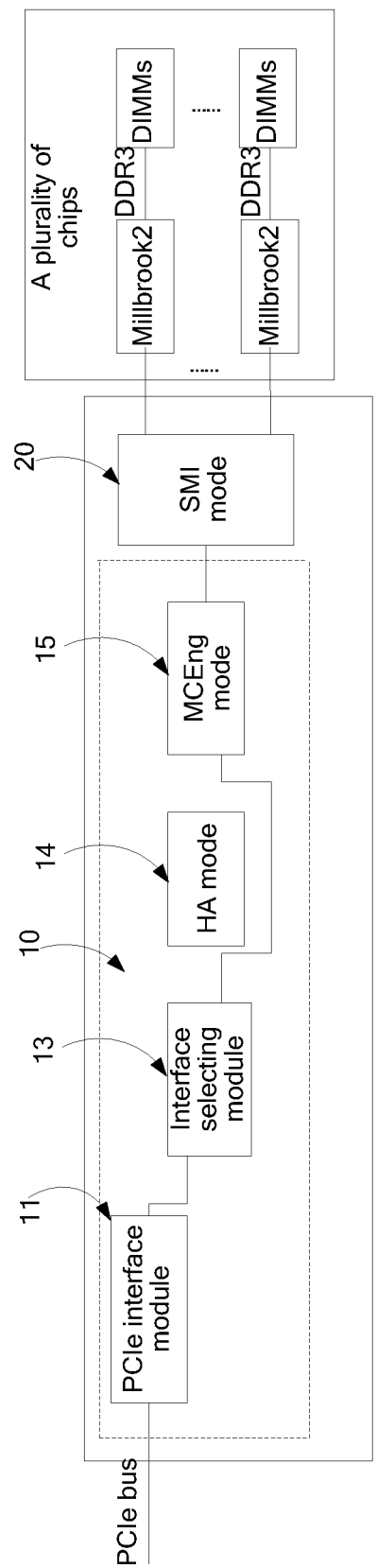
FIG. 5A and FIG. 5B are partial schematic structural diagrams of a storage expansion apparatus according to another embodiment of the present invention.
Figure 5B:
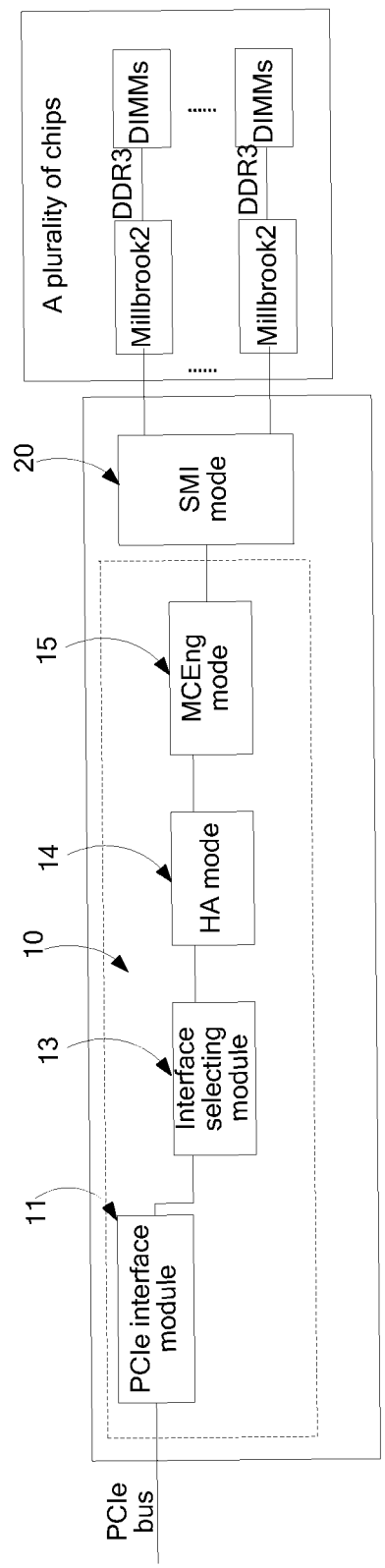

In a practical application, the selection instruction switching module 17 is connected to the QPI interface of the CPU and connected to the QPI interface module and the PCIe interface module separately, and is configured to enable data output by the QPI interface of the CPU to be transmitted to the QPI interface module 12 through the QPI bus, and send a first memory expansion instruction to the SMbus selecting module 16; and correspondingly, the SMbus selecting module 16 sends a selection instruction to the interface selecting module 13 according to the first memory expansion instruction, so that, according to the selection instruction, the interface selecting module 13 chooses to receive a QPI protocol transaction sent by the QPI interface module 12; or, the selection instruction switching module 17 is connected to the QPI interface of the CPU and connected to the QPI interface module and the PCIe interface module separately, and is configured to enable data output by the QPI interface of the CPU to be transmitted to the PCIe interface module 11 through the PCIe bus after interface adaptation, and send a second memory expansion instruction to the SMbus selecting module; and the SMbus selecting module sends another selection instruction to the interface selecting module according to the second memory expansion instruction, so that, according to the another selection instruction, the interface selecting module 13 chooses to receive a QPI protocol transaction that is obtained by the PCIe interface module 11 and sent by the PCIe interface module 11, and a subsequent data flow is shown in FIG. 5B; or the selection instruction switching module 17 is connected to the QPI interface of the CPU and connected to the QPI interface module and the PCIe interface module separately, and is configured to enable data output by the QPI interface of the CPU to be transmitted to the PCIe interface module 11 through the PCIe bus, and send a storage instruction to the SMbus selecting module; and the SMbus selecting module sends still another selection instruction to the interface selecting module according to the storage instruction, and chooses to receive a PCIe protocol storage transaction sent by the PCIe interface module 11, and a subsequent data flow is shown in FIG. 5A.

It is noteworthy that FIG. 4 does not show the HA module or the MCEng module in the storage expansion apparatus. Structures and connection relationships of the HA module and the MCEng module are basically consistent with those shown in FIG. 1A and FIG. 1B and FIG. 1C.

Further, in a practical application, if the storage expansion apparatus is used as a memory expansion device, when a user feels that the memory expansion device is no longer needed any more but a larger storage device is needed, the user may trigger the selection instruction switching module 17 to send a storage instruction to the SMbus selecting module 16, so as to implement storage expansion configuration.

As can be seen from the foregoing embodiment, the storage expansion apparatus in this embodiment, through a selection instruction switching module, triggers an SMbus selecting module to send a relevant selection instruction to an interface selecting module, so that the interface selecting module chooses to receive data of a QPI interface module 12 or a PCIe interface module 11. In this way, the storage expansion apparatus is capable of serving as a CPU memory capacity expansion device or serving as a storage expansion device of storage IO. Further, the user may further use the selection instruction switching module to switch a use attribute of the storage expansion apparatus.

In a practical application, the QPI interface module 12 primarily completes receiving of QPI data output by the QPI bus, obtaining of a QPI protocol transaction in the QPI data, and the like. Certainly, the QPI interface module 12 is configured to implement processing of QPI protocol data, complete receiving and sending of the QPI data, and the like, for example, implement physical-layer functions and link-layer functions of the QPI protocol and a packet parsing function. A rate of data that is actually transmitted by the QPI interface module 12 is the same as a transmission rate of the QPI interface of the CPU.

The PCIe interface module 11 primarily completes receiving of PCIe data output by the PCIe bus, processing of the PCIe protocol storage transaction, and is further configured to obtain a QPI protocol transaction loaded into a PCIe message transaction type. Understandably, the PCIe interface module 11 is configured to implement a transmission function of a standard PCIe protocol. Certainly, to match a transmission rate of the QPI bus as far as possible, the PCIe interface module 11 in any one of the foregoing embodiments may use a PCIe3.0 2X8 port or a PCIe3.0 X16 port as specific hardware. As shown in FIG. 4, the interface selecting module 13 may receive a selection instruction sent by the SMbus selecting module, and then process corresponding data according to the selection instruction in an adaptive manner, for example, choose to process the data transmitted by the PCIe interface module 11 or choose to process the data transmitted by the QPI interface module 12.

The HA module in this embodiment is configured to implement a high-speed cache coherence (CC) protocol, for example, handle a CC transaction operation in the QPI protocol and remain memory coherence.

The MCEng module 15 is configured to implement functions such as memory command conversion, data encryption and distribution, for example, high-speed directory caching, and high-speed data caching, and implement features such as dual in-line memory module (DIMM) access, and basic reliability, availability and serviceability (RAS).

As can be seen from the foregoing embodiment, the storage expansion apparatus in the embodiment of the present invention may be used for expanding memory configuration or used as storage expansion hardware of storage IO as selected by the user.

In addition, it should be noted that the storage expansion apparatus shown in a dashed box in FIG. 5A may serve as a device that implements a storage IO function, for example, a hard disk or a solid state disk (SSD). In this case, in the CPU, the storage expansion apparatus may be mapped to a PCIe device.

In FIG. 5B, the storage expansion apparatus shown in the dashed box may serve as a memory expansion device. In this case, in the CPU, the storage expansion apparatus may be mapped to a QPI device.

Figure 6:
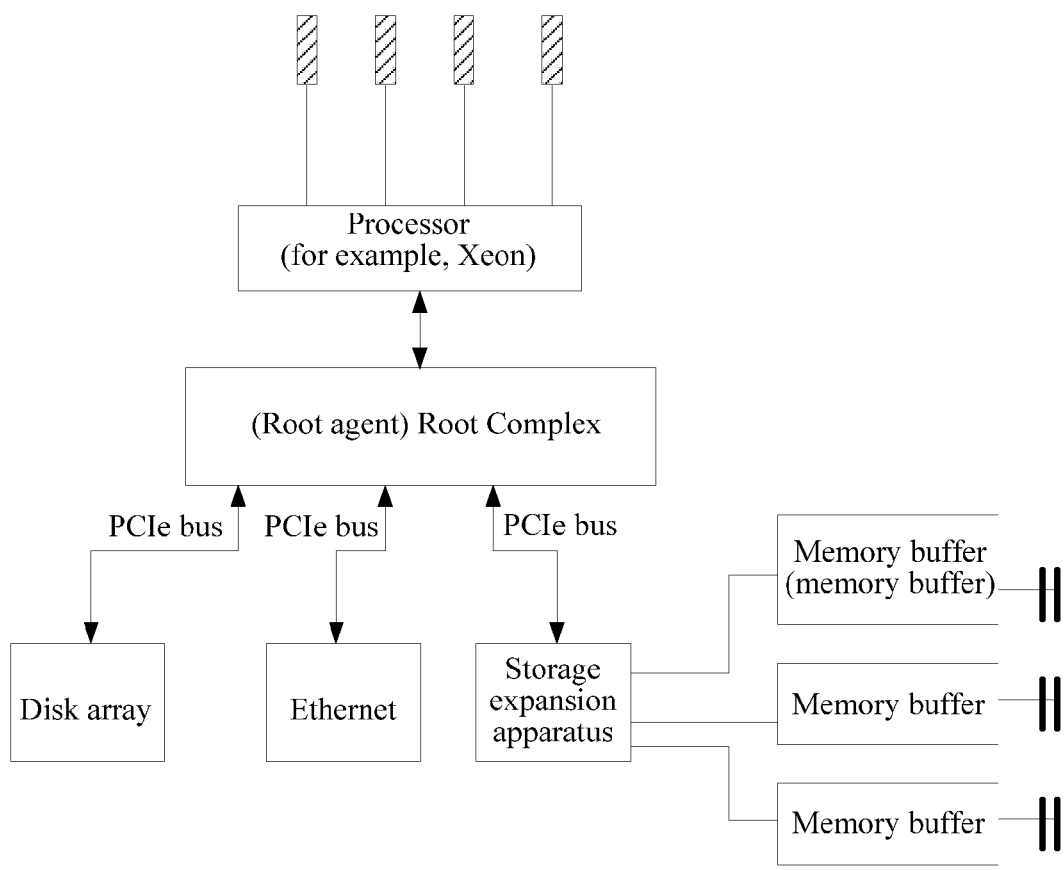
FIGS. 6-8 are scenario diagrams of practical applications of a storage expansion apparatus according to another embodiment of the present invention.

For example, when the user needs to configure the storage expansion apparatus for being applicable to an application scenario shown in FIG. 6 (that is, serving as a storage IO device), the SMbus selecting module 16 is triggered to, according to the selection instruction, drive the interface selecting module 13 to receive data that is output by the PCIe interface module and includes a PCIe protocol storage transaction, and input the data into the MCEng module 15 directly, so as to implement the application of the storage IO configuration, such as a data link indicated by the dashed box in FIG. 5A.

Figure 7:
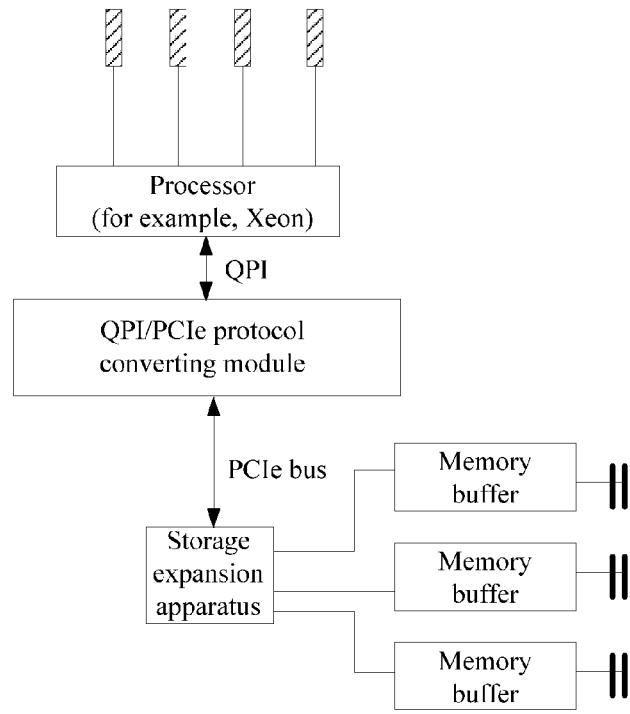

For example, when the user needs to configure the storage expansion apparatus for being applicable to an application scenario shown in FIG. 7 (that is, serving as a memory expansion device), the SMbus selecting module 16 is triggered to, according to the selection instruction, drive the interface selecting module 13 to receive data that is output by the PCIe interface module and includes a QPI protocol transaction, and input the data into the HA module 14. Then, data after being processed by the HA module 14 is input into the MCEng module 15 to implement the application of the memory expansion configuration, such as a data link indicated by the dashed box in FIG. 5B.

Figure 8:
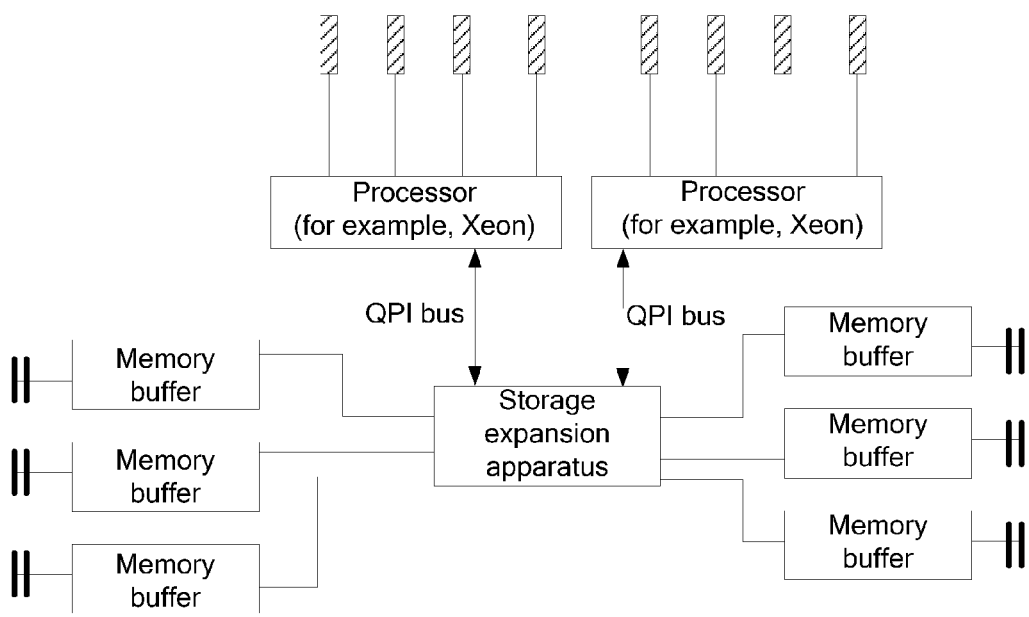

For example, when the user needs to configure the storage expansion apparatus for being applicable to an application scenario shown in FIG. 8 (that is, serving as a memory expansion device), the SMbus selecting module 16 is triggered to, according to the selection instruction, drive the interface selecting module 13 to receive data of the QPI interface module 12, and input the data into the HA module 14. Then, data after being processed by the HA module 14 is input into the MCEng module 15 to implement the application of the memory expansion configuration.

Figure 9A:
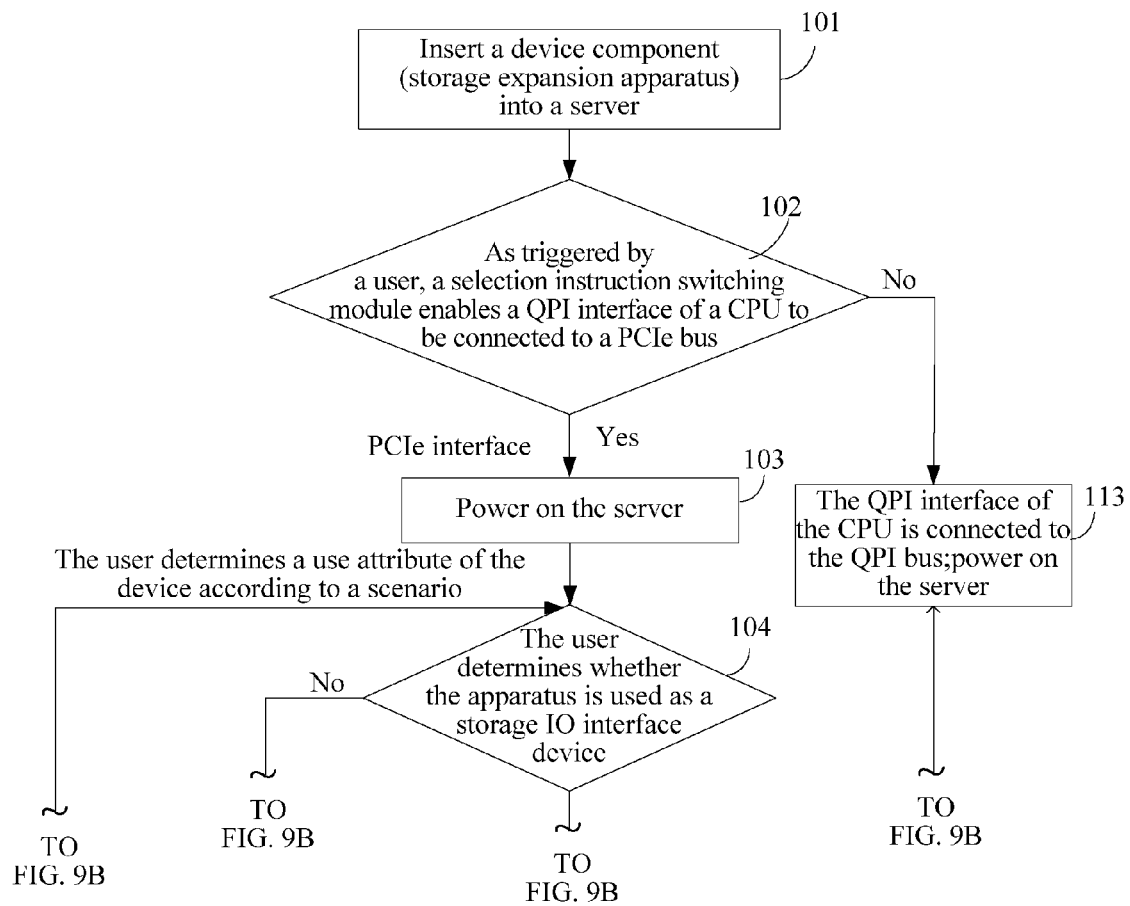
FIG. 9A and FIG. 9B are a schematic diagram of a method for using a storage expansion apparatus according to another embodiment of the present invention.
Figure 9B:
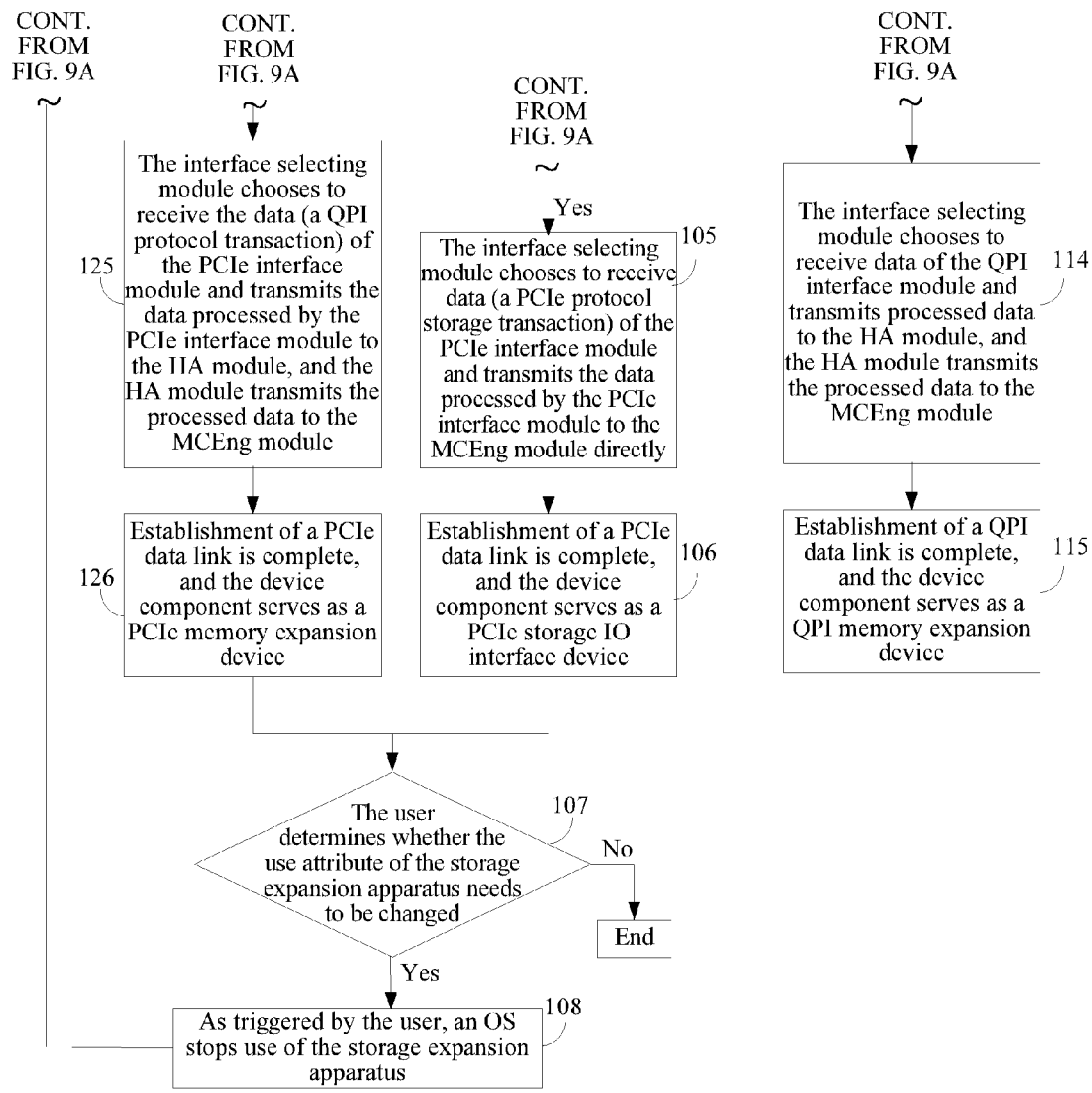

Referring to FIG. 9A and FIG. 9B, FIG. 9A and FIG. 9B show a schematic diagram of a method for using a storage expansion apparatus provided in another embodiment of the present invention. Further, the method for using a storage expansion apparatus is described below.

101. A user inserts a device component (the storage expansion apparatus) into a corresponding location in a server.

102. A selection instruction switching module enables a QPI interface of a CPU to be connected to a PCIe interface module through a PCIe bus, or connected to the PCIe interface module after interface adaptation, or connected to a QPI interface module through a QPI bus. If the QPI interface of the CPU is connected to the PCIe interface module through the PCIe bus, the following step 103 is performed; if the QPI interface of the CPU is not connected to the PCIe interface module through the PCIe bus, the following step 113 is performed.

103. Power on the server if the user enables the QPI interface of the CPU to be connected to the PCIe interface module through the PCIe bus in step 102.

It should be noted that in a practical application, if the PCIe interface module implements a memory expansion function, the PCIe interface module cannot be directly connected to the QPI interface of the CPU, and the connection is enabled using a module for converting between a PCIe protocol and a QPI protocol to process content related to the QPI protocol. In this case, the foregoing connection is that the QPI interface of the CPU is connected to the PCIe interface module through the PCIe bus after interface adaptation.

Understandably, the step 103 may also be that the user enables the QPI interface of the CPU to be connected to the PCIe interface module through the PCIe bus after interface adaptation, and then powers on the server.

104. The user determines whether the storage expansion apparatus is used as a storage IO interface device. If the storage expansion apparatus is used as a storage IO interface device, step 105 is performed; if the storage expansion apparatus is not used as a storage IO interface device, step 125 is performed.

105. If the user determines that the storage expansion apparatus is used as a storage IO interface device in step 104, the selection instruction switching module is triggered to send a storage instruction to the SMbus selecting module. According to the storage instruction, the SMbus selecting module delivers a selection instruction to the interface selecting module, so that, according to the selection instruction, the interface selecting module chooses to receive data of the PCIe interface module (for example, receive a PCIe protocol storage transaction obtained from PCIe data), and transmits the data (for example, the PCIe protocol storage transaction) of the PCIe interface module to the MCEng module directly.

106. Establishment of a PCIe data link is complete, and the device component is used as a PCIe storage IO interface device.

Further, step 107 is included. In this case, the user determines whether a use attribute of the storage expansion apparatus needs to be changed. If the use attribute needs to be changed, step 104 is performed again after step 108 is performed; if the use attribute does not need to be changed, the procedure is ended.

Step 108: As triggered by the user, an operating system (OS) stops use of the storage expansion apparatus, and then performs step 104 again.

It is noteworthy that in order to prevent data omission, the OS must stop the use of the storage expansion apparatus first before application switching is performed between a storage IO interface device and a memory expansion device.

125. If the user determines that the storage expansion apparatus is used as a memory expansion device in step 104, the selection instruction switching module is triggered to send a second memory expansion instruction to the SMbus selecting module. According to the second memory expansion instruction, the SMbus selecting module delivers a selection instruction to the interface selecting module, so that, according to the selection instruction, the interface selecting module chooses to receive the data (for example, a QPI protocol transaction) of the PCIe interface module, processes the data (for example, a QPI protocol transaction obtained by the PCIe interface module) of the PCIe interface module, and then transmits processed data to the HA module. Then, data after being processed by the HA module is transmitted to the MCEng module to implement memory expansion.

126. Establishment of a PCIe data link is complete, and the device component is used as a PCIe memory expansion device.

113. Power on the server if the user enables the QPI interface of the CPU to be connected to the QPI interface module through the QPI bus in step 102.

114. The selection instruction switching module is triggered to send a first memory expansion instruction to the SMbus selecting module. According to the first memory expansion instruction, the SMbus selecting module delivers a selection instruction to the interface selecting module, so that, according to the selection instruction, the interface selecting module chooses to receive data (for example, a QPI protocol transaction) of the QPI interface module, and transmits processed data to the HA module. The HA module transmits the processed data to the MCEng module to implement memory expansion.

115. Establishment of a QPI data link is complete, and the device component is used as a QPI memory expansion device.

In this way, the storage expansion apparatus can be applied to meet different requirements of a plurality of configurations (server memory expansion and storage IO) without adding a new hardware device, thereby improving efficiency of using the storage expansion apparatus.

In a practical application, the storage expansion apparatus may be located in a field-programmable gate array (FPGA) or an application specific integrated circuit (ASIC).

According to another aspect of the present invention, the present invention further provides a server, including a CPU and the storage expansion apparatus described in any embodiment of the present invention, where the CPU is connected to a QPI interface module in the storage expansion apparatus through a QPI bus, and the CPU is connected to a PCIe interface module in the storage expansion apparatus through a PCIe bus.

For example, the server includes a CPU with a QPI interface and further includes the storage expansion apparatus described in any embodiment of the present invention, where the QPI interface of the CPU is connected to the QPI interface module in the storage expansion apparatus through the QPI bus, and the QPI interface is connected to the PCIe interface module in the storage expansion apparatus through the PCIe bus.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof. Such modifications or replacements do not make the essence of the corresponding technical solutions depart from the scope of the technical solutions of the embodiments of the present invention.

What is claimed is:

1. A storage expansion apparatus comprising:
    a quick path interconnect (QPI) interface module, which communicates with a central processing unit (CPU) through a QPI bus;
    a peripheral component interconnect express (PCIe) interface module, which communicates with the CPU through a PCIe bus;
    an interface selecting module connected to the QPI interface module and the PCIe interface module separately;
    a home agent (HA) module connected to the interface selecting module; and
    a memory controller engine (MCEng) module connected to the HA module and the interface selecting module separately; wherein, when the storage expansion apparatus serves as a storage input and output (TO) interface device, the PCIe interface module is configured to:
        complete receiving of PCIe data sent through the PCIe bus;
        process a PCIe protocol storage transaction in the PCIe data; and
        send a processed PCIe protocol storage transaction to the MCEng module through the interface selecting module,
    wherein the MCEng module implements a read/write drive function and provides an interface for connecting to a storage IO device,
    wherein when the storage expansion apparatus serves as a memory expansion device, the QPI interface module is configured to:
        complete receiving of QPI data sent through the QPI bus;
        obtain a QPI protocol transaction in the QPI data;
        send the QPI protocol transaction to the interface selecting module; and
        output the QPI protocol transaction in the QPI data to the HA module through the interface selecting module,
    wherein the HA module processes the QPI protocol transaction in the QPI data, and sends a processed QPI protocol transaction to the MCEng module,
    wherein the MCEng module implements a read/write drive function and provides an interface for connecting to an expanded memory,
    wherein when the storage expansion apparatus serves as a memory expansion device, the PCIe interface module is configured to:
        complete receiving of PCIe data sent through the PCIe bus;
        obtain a QPI protocol transaction in the PCIe data;
        send the QPI protocol transaction to the interface selecting module; and
        output the QPI protocol transaction in the PCIe data to the HA module through the interface selecting module,
    wherein the HA module processes the QPI protocol transaction in the PCIe data, and sends a processed QPI protocol transaction in the PCIe data to the MCEng module, and
    wherein the MCEng module implements a read/write drive function and provides an interface for connecting to an expanded memory.

2. The apparatus according to claim 1, further comprising a system management bus (SMbus) selecting module, connected to the interface selecting module and configured to send a selection instruction to the interface selecting module, so that, according to the selection instruction, the interface selecting module chooses to receive the QPI protocol transaction that is obtained by the QPI interface module and sent by the QPI interface module.

3. The apparatus according to claim 1, wherein the storage apparatus is part of a server, wherein the server further comprises a CPU, wherein the CPU is connected to the QPI interface module in the storage expansion apparatus through the QPI bus, and wherein the CPU is connected to the PCIe interface module in the storage expansion apparatus through the PCIe bus.

4. The apparatus according to claim 1, further comprising a system SMbus selecting module, connected to the interface selecting module and configured to send a selection instruction to the interface selecting module, so that, according to the selection instruction, the interface selecting module chooses to receive the QPI protocol transaction that is obtained by the PCIe interface module and sent by the PCIe interface module.

5. The apparatus according to claim 1, further comprising a SMbus selecting module, connected to the interface selecting module and configured to send a selection instruction to the interface selecting module, so that, according to the selection instruction, the interface selecting module chooses to receive the processed PCIe protocol storage transaction sent by the PCIe interface module.

6. The apparatus according to claim 2, further comprising a selection instruction switching module connected to the CPU, connected to the QPI interface module and the PCIe interface module separately, and configured to:
enable data output by the CPU to be transmitted to the QPI interface module through the QPI bus; and
send a first memory expansion instruction to the SMbus selecting module, wherein the SMbus selecting module sends the selection instruction to the interface selecting module according to the first memory expansion instruction.

7. The apparatus according to claim 2, further comprising a selection instruction switching module connected to the CPU, connected to the QPI interface module and the PCIe interface module separately, and configured to:
enable data output by the CPU to be transmitted to the PCIe interface module through the PCIe bus after interface adaptation; and
send a second memory expansion instruction to the SMbus selecting module, wherein the SMbus selecting module sends the selection instruction to the interface selecting module according to the second memory expansion instruction.

8. The apparatus according to claim 2, further comprising a selection instruction switching module connected to the CPU, connected to the QPI interface module and the PCIe interface module separately, and configured to:
enable data output by the CPU to be transmitted to the PCIe interface module through the PCIe bus; and
send a storage instruction to the SMbus selecting module, wherein the SMbus selecting module sends the selection instruction to the interface selecting module according to the storage instruction.

9. The apparatus according to claim 2, wherein the storage apparatus is part of a server, wherein the server further comprises a CPU, wherein the CPU is connected to the QPI interface module in the storage expansion apparatus through the QPI bus, and the CPU is connected to the PCIe interface module in the storage expansion apparatus through the PCIe bus.

10. The apparatus according to claim 6, wherein the storage apparatus is part of a server, wherein the server further comprises a CPU, wherein the CPU is connected to the QPI interface module in the storage expansion apparatus through the QPI bus, and wherein the CPU is connected to the PCIe interface module in the storage expansion apparatus through the PCIe bus.

* * * * *

UNITED STATES PATENT AND TRADEMARK OFFICE
CERTIFICATE OF CORRECTION

PATENT NO. : 9,053,252 B2
APPLICATION NO. : 14/512790
DATED : June 9, 2015
INVENTOR(S) : Sheng Chang, Gongyi Wang and Tao Li It is certified that error appears in the above-identified patent and that said Letters Patent is hereby corrected as shown below:

In the Claims:
Column 12, line 1, claim 1 should read serves as a storage input and output "(IO)" interface
Column 14, line 22, claim 10 should read The apparatus according to claim "3", wherein the storage Signed and Sealed this
Second Day of August, 2016

Michelle K. Lee
*Director of the United States Patent and Trademark Office*